US005846175A

United States Patent [19]

Chen

[11] Patent Number: 5,846,175

[45] Date of Patent: Dec. 8, 1998

[54] HAND PRESSURE ROLLER FOR POSTERS

[76] Inventor: Hu Chen, Room 12, 9 Fl., No. 34, Te Hui St., Taipei, Taiwan

[21] Appl. No.: 762,214

[22] Filed: Dec. 6, 1996

[51] Int. Cl.[6] ............................ B29C 59/04; B25B 27/00

[52] U.S. Cl. .............................. 492/13; 492/56; 156/574; 156/579

[58] Field of Search ................................. 492/13, 56, 22, 492/19; 156/579, 580, 306.3, 574; 100/210; 15/230.11, 248.2

[56] References Cited

U.S. PATENT DOCUMENTS

| | | | |
|---|---|---|---|
| 2,225,229 | 12/1940 | Neuwirth | 216/61 |
| 3,709,760 | 1/1973 | Knoner | 156/579 |
| 4,569,099 | 2/1986 | Harding | 15/248.2 |
| 4,806,194 | 2/1989 | Wald | 156/579 |
| 5,384,001 | 1/1995 | Hoopengardner | 156/579 |

*Primary Examiner*—John Sipos
*Assistant Examiner*—Matthew D. Luby
*Attorney, Agent, or Firm*—Pro-Techtor International Services

[57] ABSTRACT

A hand pressure roller adapted for spreading a sticky transparent film over a stripping paper for removing a back-glued cut pattern from said stripping paper, including a roller frame and a roller, the roller frame having an upright front panel, two forward front lugs bilaterally extended from the front panel for holding the roller, a handle backwardly extended from the front panel for moving the roller with the hand, and a back panel obliquely downwardly extended from the rear side and terminating in a smoothly curved upward tail for pressing over the workpiece, the roller having two bearings at two opposite ends of a roller shaft thereof pivotably connected between the front lugs of the roller frame by a respective pivot.

1 Claim, 4 Drawing Sheets

HAND PRESSURE ROLLER FOR POSTERS

BACKGROUND OF THE INVENTION

The present invention relates to a hand pressure roller, and more particularly to such a hand pressure roller adapted for spreading a sticky, transparent film over a stripping paper for removing a back-glued cut pattern from the stripping paper.

Conventional plane surface advertising media or signs are commonly achieved by painting. Nowadays, computers have been intensively used in designing and editing an advertising pattern, and then cutting the designed pattern in a back-glued sheet material, which is adhered to a stripping paper. The cut pattern is then removed from the stripping paper, and then posted on the signboard by posters. Because the cut pattern may includes series of separated letters, it is difficult to remove the cut pattern from the stripping paper and then to accurately post every separated letters of the cut pattern on the signboard in designated position. When using a scraper or any suitable tool to pick up the cut pattern from the stripping paper, the edge of the cut pattern may be damaged easily.

SUMMARY OF THE INVENTION

The present invention provides a hand pressure roller specially designed for posters for use to spread a sticky, transparent film over a stripping paper for removing a back-glued cut pattern from the stripping paper, so that the sticky, transparent film with the adhered back-glued cut pattern can be further posted on a signboard or the like. The hand pressure roller comprises a roller frame holding a rubber roller at the front side. The roller frame has a handle attached therefor for moving with the hand, and a impression tail for imparting a pressure to the workpiece over which the rubber roller is moved.

DETAILED DESCRIPTION OF THE PREFERRED EMBODIMENT

Figure 1:
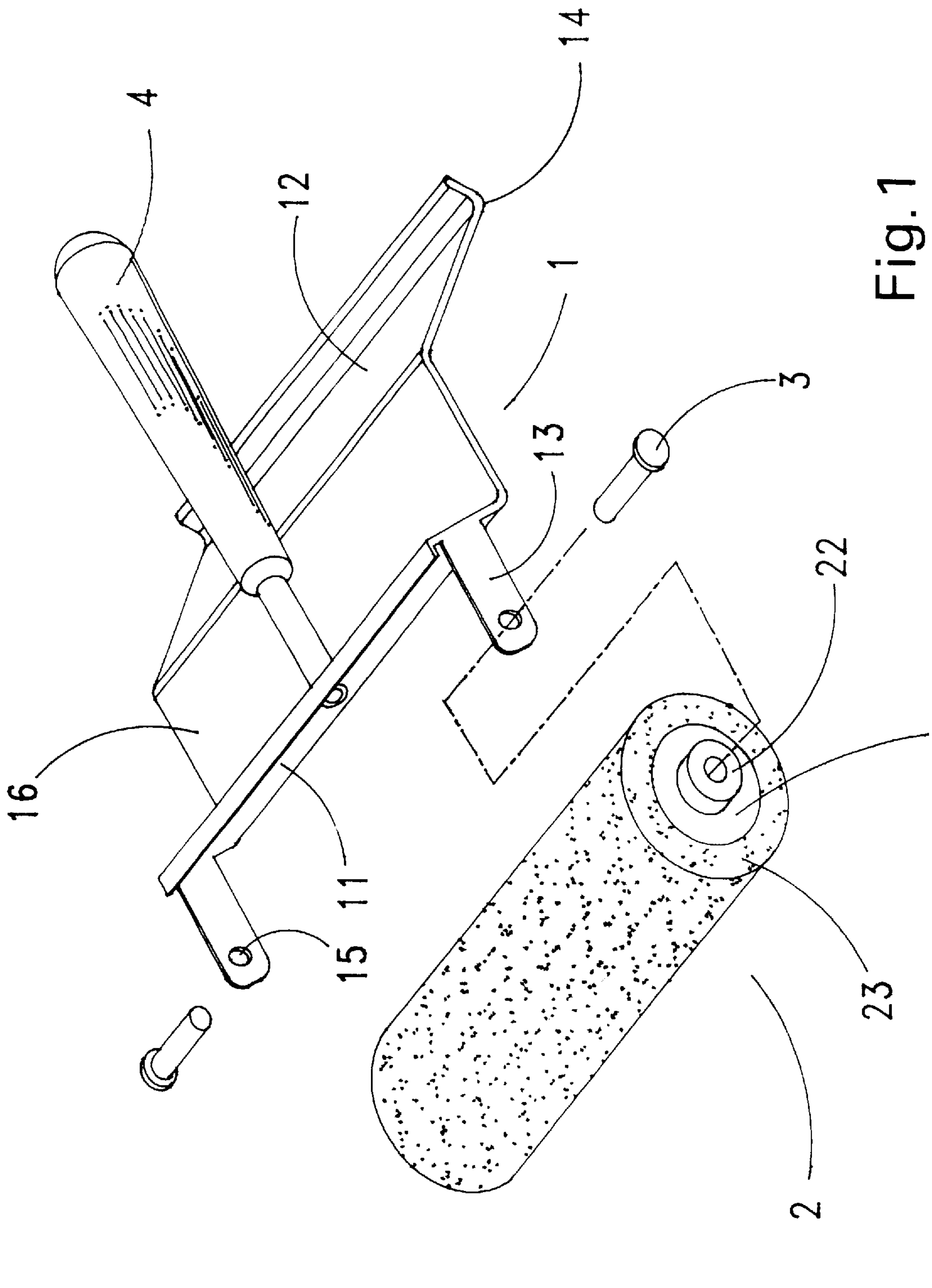
FIG. 1 is an exploded view of a hand pressure roller according to the present invention.
Figure 2:
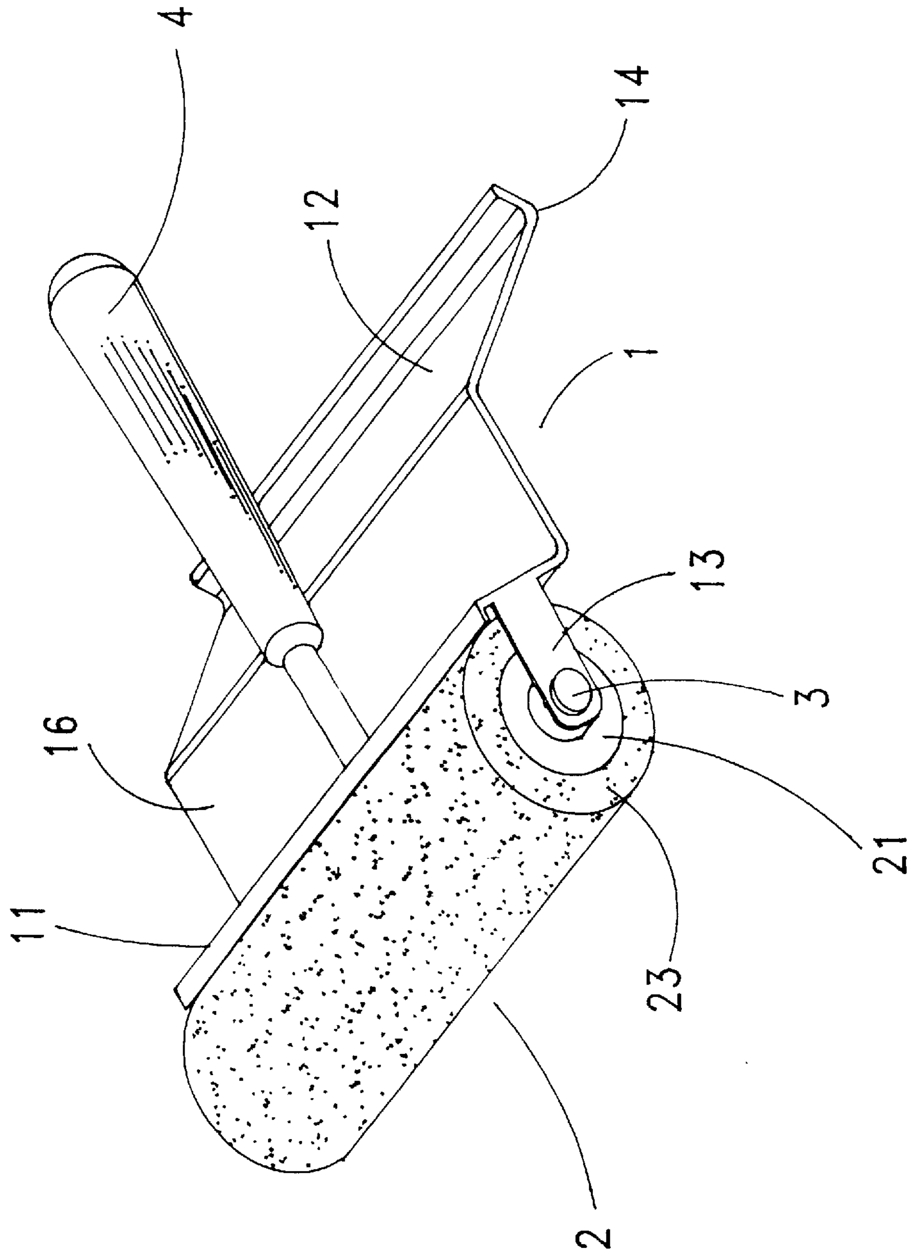
FIG. 2 is an elevational view of the hand pressure roller shown in FIG. 1.

Referring to FIGS. 1 and 2, a hand pressure roller in accordance with the present invention is generally comprised of a roller frame 1, and a roller 2. The roller frame 1 comprises a base panel 16, a front panel 11 extended from one side (namely, the front side) of the base panel 16 at right angles, a back panel 12 obliquely downwardly extended from an opposite side (namely, the rear side) of the base panel 16 at about 130° angle and terminating in a smoothly curved impression tail 14, two front lugs 13 forwardly and perpendicularly extended from two opposite ends of the front panel 11 and having a respectively pivot hole 15, and a handle 4 backwardly and perpendicularly extended from a middle part of the front panel 11. The axial length of the roller 2 is shorter than the distance between the front lugs 13.

The roller 2 comprises a roller shaft 21 made from aluminum alloy, two bearings 22 disposed at two opposite ends of the roller shaft 21 and respectively connected to the pivot holes 15 of the front lugs 13 by a respective pivot 3, and a rubber covering 23 mounted around the roller shaft 21. When the front panel 11 is pushed forwards with the hand through the handle 4, the roller 2 is turned forwards, and the smoothly curved impression tail 14 is moved over the workpiece.

Figure 3:
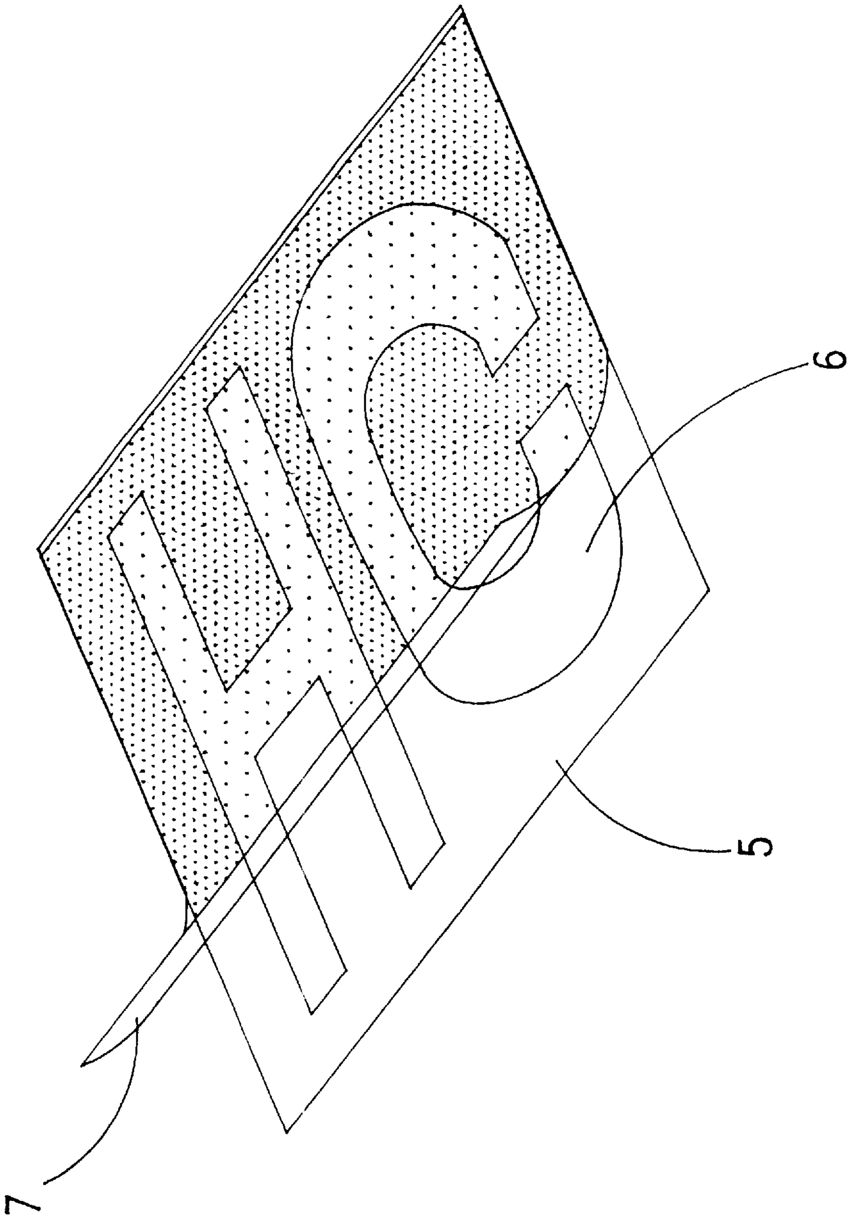
FIG. 3 shows a sticky, transparent film covered on a stripping paper over a cut pattern.

Referring to FIG. 3, the hand pressure roller of the present invention is adapted for spreading a sticky, transparent film 7 over a stripping sheet for example a stripping paper 5 for removing a back-glued cut pattern 6 from the stripping paper 5, so that the sticky, transparent film 7 with the adhered back-glued cut pattern 6 can be posted on a signboard or the like.

Figure 4:
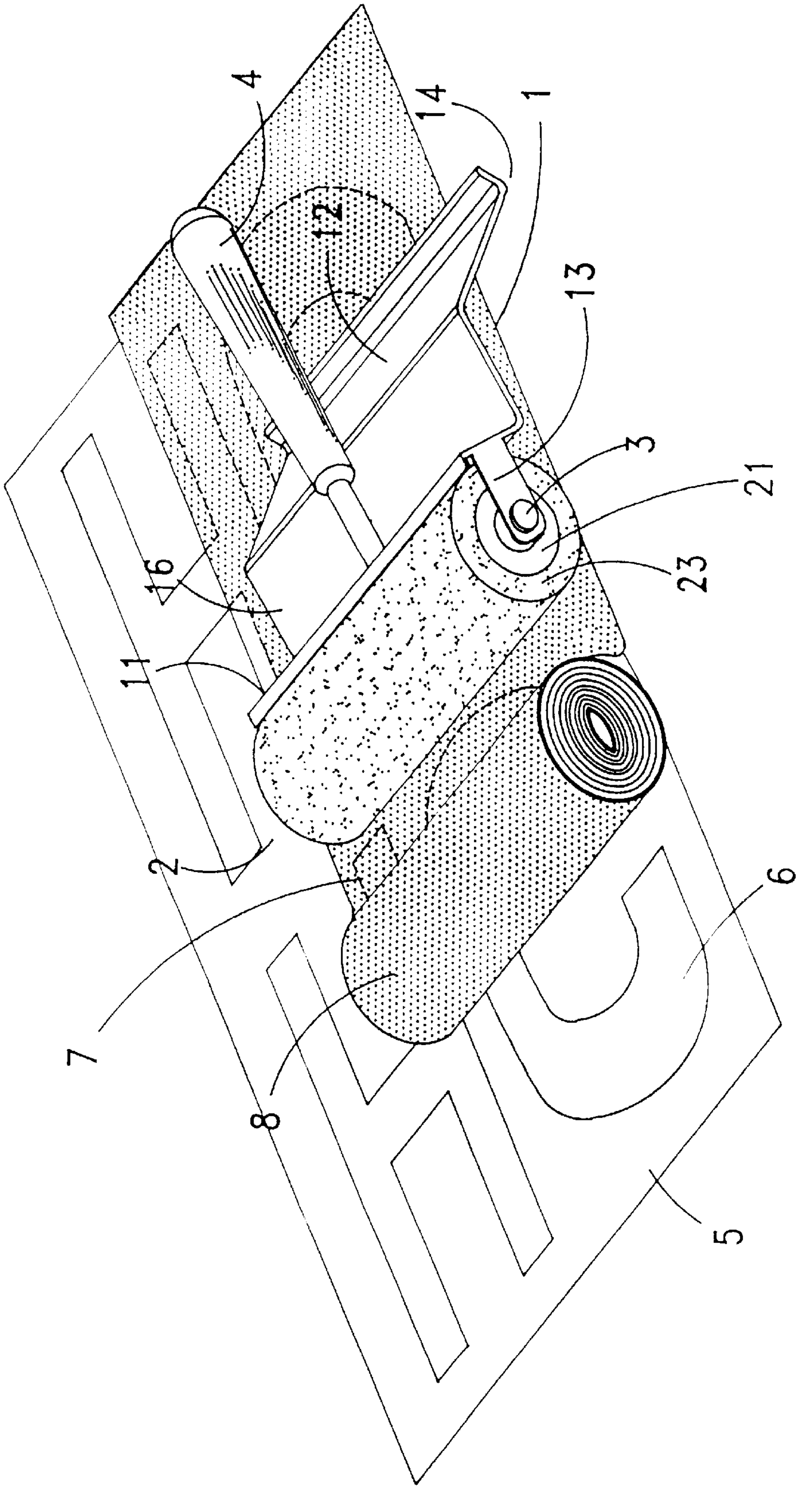
FIG. 4 is an applied view of the present invention, showing a roll of a sticky, transparent film spread out, and the impression tail moved over the sticky, transparent film.

FIG. 4 shows an application example of the present invention. One end of the sticky, transparent film roll, referenced by 8, is adhered to one side of the stripping paper 5, then the hand pressure roller is moved to push the sticky, transparent film roll 8 forwards, causing the sticky, transparent film 7 of the sticky transparent film roll 8 to be spread over the cut pattern 6, and at the same time the smoothly curved impression tail 14 is moved over the sticky, transparent film 7, causing it to be adhered to the back-glued cut pattern 6. When the sticky, transparent film 7 is stripped from the stripping paper 5, the back-glued cut pattern 6 is removed from the stripping paper 5 and adhered to the sticky, transparent film 7. Therefore, the sticky, transparent film 7 with the adhered, back-glued cut pattern 6 can be posted on an advertising cloth wall, plastic or wooden signboard, etc.

While only one embodiment of the present invention has been shown and described, it will be understood that various modifications and changes could be made thereunto without departing from the spirit and scope of the invention disclosed.

What the invention claimed is:

1. A hand pressure roller for spreading a sticky transparent film over a stripping paper for taking a back-glued cut pattern from said stripping paper:

a roller frame, said roller frame comprising a base panel having a front side and a rear side, a front panel extended upwardly from the front side of said base panel at right angles, when said frame is positioned over said paper and film a back panel obliquely downwardly extended from the rear side of said base panel and terminating in a smoothly curved upward tail, two front lugs forwardly and perpendicularly extended from two opposite ends of said front panel and having a respectively pivot hole, and a handle backwardly and perpendicularly extended from a middle part of said front panel; and a roller connected between the front lugs of said roller frame in parallel to said front panel, said roller comprising a roller shaft made from aluminum alloy, two bearings disposed at two opposite ends of said roller shaft and respectively connected to the pivot holes of said front lugs by a respective pivot, and a rubber covering mounted around said roller shaft, said roller and tail contacting said film to apply pressure to said paper and film.

* * * * *